United States Patent [19]
Zapico

[11] Patent Number: 5,001,231
[45] Date of Patent: Mar. 19, 1991

[54] INVERT EMULSION POLYSACCHARIDE SLURRY

[75] Inventor: Jose Zapico, Val de Reuil, France

[73] Assignee: Aqualon Company, Wilmington, Del.

[21] Appl. No.: 439,108

[22] Filed: Nov. 20, 1989

Related U.S. Application Data

[63] Continuation-in-part of Ser. No. 362,587, Jun. 7, 1989, Pat. No. 4,990,608.

[51] Int. Cl.$^5$ .................. C08B 11/00; C08B 11/193; C08B 11/08; C08B 11/12
[52] U.S. Cl. .......................... 536/84; 536/90; 536/91; 536/95; 536/96; 536/97; 536/98; 536/99; 536/111; 536/112; 536/120
[58] Field of Search ............. 536/50, 51, 52, 84, 536/88, 90, 91, 95, 96, 97, 98, 99, 100, 111, 112, 120, 130

[56] References Cited

U.S. PATENT DOCUMENTS

| | | | |
|---|---|---|---|
| 3,378,070 | 4/1968 | Wessler et al. | 536/96 |
| 3,498,971 | 3/1970 | Blaga et al. | 536/98 |
| 3,574,188 | 4/1971 | Takehara et al. | 536/98 |
| 4,228,277 | 10/1980 | Landoll | 536/90 |
| 4,336,146 | 6/1982 | Majewicz et al. | 252/8.55 R |
| 4,720,303 | 1/1988 | Soldatos | 106/181 |
| 4,798,888 | 1/1989 | Symes et al. | 536/114 |
| 4,799,962 | 1/1989 | Ahmed | 106/188 |

OTHER PUBLICATIONS

Ullmanns Encyklopadie der technischen Chemie, Band 9, 1975.

*Primary Examiner*—Nathan M. Nutter
*Attorney, Agent, or Firm*—James K. Luchs

[57] ABSTRACT

Carboxymethylhydroxyethyl (CMHEC), starch and guar are preferred polysaccharides providing at least a 1% solution viscosity of 1000 cps at 25 C. An invert emulsion for oil drilling or paper manufacture comprises on a weight percent basis:

| | |
|---|---|
| Diesel, mineral or paraffin oil | 40–60 |
| Imidazole surfactant | 1–4 |
| Water | 0–10 |
| Organophilic clay | 0.5–5.0 |
| CMHEC, starch or guar | 40–60 |

7 Claims, No Drawings

INVERT EMULSION POLYSACCHARIDE SLURRY

This application is a continuation-in-part of my co-pending U.S. Pat. Application Ser. No. 07/362/587, filed June 7, 1989, now U.S. Pat. No. 4,990,608.

FIELD OF THE INVENTION

The invention relates to emulsions containing a polysaccharide. In particular, the invention relates to the advantages of polysaccharides dispersed in an invert emulsion over addition as a powder form.

BACKGROUND OF THE INVENTION

Modified cellulose and similar polysaccharides are known to have a variety of uses in the form of powders and solutions. Applications are known in foods, pharmaceuticals, oil drilling, etc. Still in spite of all known uses and applications, it remained for the present invention to advance the State-of the-Art for invert emulsions.

Bentonite clay is commonly used to retain water within diaphragm walls during construction. A disadvantage of this material is that the clay must be disposed of after it has served its purpose.

Ullmans Encyclopadie der technischen Chemie, 4th Edition, Vol. 9, pp.192,209, refers to the use of water soluble cellulose ethers such as sodium carboxymethylcellulose for use for diaphragm wall construction. Modified cellulose ethers and their use as thickeners and dispersion agents are described in U.S. Pat. Nos. 4,228,277, 4,336,146, 4,720,303 and 4,799,962. But in spite of what was previously published and known to workers in the construction field, prior attempts to use cellulosic polymers for diaphragm wall construction were not completely satisfactory due to the inability to prevent water loss from the filled trench into the surrounding soil. As a result, clay continued to be used for diaphragm wall construction in spite of the environmental advantages of the use of a biodegradable polymer such as cellulose.

SUMMARY OF THE INVENTION

It is an obJect of the invention to provide an invert emulsion of a polysaccharide which can be used to replace powder in formulations for the convenience of a consumer.

In the diaphragm wall industry, a polysaccharide can be used in a powder form to prevent water loss in low permeability zones if a 1% solution of the polysaccharide gives a viscosity of at least 1000 MPas at 25° C. and a 1% solids mixture of the polysaccharide in water contains at least 10% by weight gelatinous particles.

Preferred polysaccharides give a viscosity of at least 2000 MPas and contain at least 20% gelatinous particles. Preferred polysaccharides are carboxymethylcellulose (CMC) with a degree of substitution of 0.8 or hydroxyethylcellulose (HEC) with a molar substitution of 2.0–2.5.

In the diaphragm wall industry, a polysaccharide can be used in an invert emulsion slurry to prevent water loss in low and high permeability zones without any requirement concerning the gelatinous particles. A slurry for diaphragm wall construction comprises on a weight percent basis:

| Solvent | 40–80% |
|---|---|
| Surfactant | 0.5–5% |
| Water | 0–10% |
| Organophilic clay | 0.5–5% |
| Polysaccharide | 20–60% |

A preferred slurry comprises:

| Paraffin oil | 45% |
|---|---|
| Surfactant | 2.5% |
| Water | 6% |
| Organophilic Clay | 1% |
| CMC or HEC | 45.5% |

DETAILED DESCRIPTION OF THE INVENTION

A problem has existed where modified polysaccharides such as cellulose and guar (galactomannan) must be mixed into water mixtures in a powdered form. This is particularly true when the mixing must be done at a field location such as a construction site or outdoor treatment, handling or drilling operation. Even when the mixing can be done indoors or under shelter from the elements, there is a desire by many consumers that the product they receive be in a form that allows it to be used with as little handling as possible. Thus, there is a convenience factor in addition to a problem solution for the invert emulsions of the invention.

Diaphram wall construction is common civil engineering practice for the construction of large buildings. A trench is dug around the perimeter of the building and filled with concrete to form the walls. During the digging process, the trench is kept filled with water to prevent the sides of the trench from collapsing. In order to prevent the water from migrating from the trench to the surrounding soil the water must be thickened.

Bentonite which has been the practical choice for use in such trenches has several drawbacks.

(1) Large quantities must be used because it is not an efficient thickener.
(2) Bentonite forms a thick filter cake on the wall of the excavation which interferes with concrete pouring and bonding to the soil.
(3) After the trench is filled with concrete, the displaced bentonite slurry creates a disposal problem.

It has now been discovered that the disadvantages of the prior art can be avoided with polysaccharides including starch, carboxymethylcellulose, guar, sugar beet pulp derivative and hydroxyethylcellulose. Also a more cost efficient wall can be produced according to the practice of the present invention.

When added to water these polysaccharides with suitable viscosity and solvation properties are observed to produce a thickened gelatinous slurry which does not rapidly convert to a solution. These polymers have a long solvation time either when added to water as a powder or in the form of an oil slurry.

Based upon a theoretical maximum degree of substitution of 3.0 for carboxymethyl cellulose; it has been discovered that a degree of substitution (D.S.) of at least 0.5 is required. It is preferred that D.S. be 0.8 or higher. In the case of hydroxyethylcellulose, molar substitution (M.S.) of at least 1.8 is required while 2.0 to 2.5 is preferred.

It has been discovered that in the case of low permeability soil a gelatinous particle content of at least 10% is required to prevent fluid loss. A gelatinous particle content of up to 20% is preferred. But for high permeability soils, an oil slurry of a polysaccharide is added into the mud or dispersed in a slurry form. In low permeability soils a polymer solution can be applied directly, but for high permeability soils an oil slurry is added into the mud in a freshly dug diaphragm construction trench.

A typical slurry formulation comprises in weight percent:

| | |
|---|---|
| Solvent | 45 |
| Surfactant | 2.5 |
| Water | 6 |
| Organophilic clay | 1 |
| Polysaccharide | 45.5 |

The solvent used to prepare the slurry can be diesel oil, liquid paraffin, mineral oil or vegetable oil.

Useful surfactants include imidazoline, lechithin, fatty acids soaps and other substances suitable for preparing an invert oil emulsion slurry.

Suitable organophillic clays include Bentone ® available from Ceca SA and clays from GeoServices, Paris, France; and Chronos from Titan (Germany).

As prepared according to the present invention, the slurry provides fast polymer swelling when added into the mud in a construction trench. Lumps are produced which coat the voids responsible for mud loss. These lumps will resist further solvation. It was unexpected to find that these lumps could be formed rapidly and still remain stable while protecting against fluid loss without being solubilized.

Expressed in different terms of both solid and liquid ingredients, the following ranges of variation are possible for practice of the invention:

| | |
|---|---|
| Solvent | 40 to 80% of the complete slurry |
| Polymer | 20 to 60% of the complete slurry |
| Water | 0 to 20% of the liquid phase |
| Surfactant | 5 to 30 Kg/m$^3$ of the liquid phase |
| Clay | 5 to 30 Kg/m$^3$ of the liquid phase |

The following examples illustrate the practice of the invention which has industrial applicability for civil engineering, oil drilling, rheology control and mortar and cement formulation.

EXAMPLE 1

The following Parts by weight of ingredients were combined to produce a slurry.

| | Parts |
|---|---|
| Paraffin oil | 45 |
| Geumol imidazoline surfactant available from GeoService, Paris, France | 2.5 |
| Tap Water | 6 |
| Organophilic clay available from GeoService, Paris, France | 1 |
| Carboxymethylcellulose Grade 7 from Aqualon Company having a 0.8 D.S. | 45.5 |

The slurry was poured into a diaphragm construction trench filled with mud and freshly dug in a highly porous soil. A severe mud loss was observed initially, but the slurry containing CMC which did not dissolve further coated the walls of the trench to prevent further fluid loss into the surrounding soil.

After the trench was complete around the perimeter of a construction site, concrete was poured into the trench and the mud was displaced.

A comparison diaphragm construction trench filled with clay and carboxymethylcellulose polymer showed greater fluid loss than the invention.

EXAMPLE 2

Invert emulsions containing a stabilizing amount of polysaccharide were prepared according to the general formulation:

| | |
|---|---|
| Paraffinic Oil available from EXXON Co. | 242 g. |
| GEOMUL imidazoline surfactant available from GeoService, Paris, France | 12 g. |
| Tap water | 9 g. |
| Organophilic clay available from GeoService, Paris, France | 9 g. |
| Polymer (CMC, HEC, MC, CMHEC) available from Aqualon | 225 g. |

These emulsions were satisfactory when tested for applications for drilling mud viscosifiers, oil cementing additives, water retention agents, rheology control agents for paper coating formulations and mortar additives. This example illustrates that hydroxyethycellulose (HEC), methylcellulose (MC) and carboxymethylhydroxyethylcellulose (CMHEC) substituted to a degree to provide a 1% viscosity of at least 1000 MPas are suitable for preparation of the invert oil slurries of the invention as would also be the case for hydroxypropylguar, carboxymethylguar and starch which has been substituted with carboxymethyl, hyrdoxyethyl and/or hydroxypropyl groups.

EXAMPLE 3

The following combinations of solvent and polymer were satisfactorily tested as invert emulsions;

| Solvent | | Polymer | | |
|---|---|---|---|---|
| Amount (g) | Type | Amount (g) | Type | Brookfield Viscosity |
| 242 | Paraffinic | 225 | CMC 9H4X[1] | 780 |
| 242 | Paraffinic | 333 | CMC 9H4X[1] | 3060 |
| 242 | Paraffinic | 225 | HEC 250 HHXR[1] | 1340 |
| 242 | Paraffinic | 272 | HEC 250 HHXR[1] | 2660 |
| 260 | Mineral | 225 | HEC 250 HHXR[1] | 2940 |
| 242 | Paraffinic | 225 | HEC 250 EXR[1] | 880 |
| 242 | Paraffinic | 225 | Starch[2] | 1500 |
| 221 | Paraffinic | 225 | CMHEC 420 H[3] | 1240 |

[1] Modified cellulosic available from Aqualon Company.
[2] Available from Aqualon Company
[3] Carboxymethylhydroxyethyl cellulose available from Aqualon Company.

This example illustrates that mineral, as well as parafinic, oil is suitable for the practice of the invention. Further, it is not necessary that the polysaccharide be modified if sufficient viscosity buildup is provided within the invert emulsion. Thus unmodified poylgactomman (guar gum) could be used which gave sufficient viscosity buildup.

What is claimed is:

1. An invert emulsion polysaccharide composition suitable for industrial use comprises oil, water, surfactant, organophilic clay, and at least one polysaccharide from the group consisting of hydroxypropylguar (HPG), methylcellulose (MC), carboxymethylhydroxyethylcellulose (CMHEC) guar and starch wherein a 1% solids solution of the polysaccharide gives a viscosity of at least 1000 cps at 25° C.

2. The invert emulsion of claim 1 where the polysaccharide is CMHEC, starch of guar.

3. The invert emulsion of claim 2 where the viscosity is at least 2000 cps.

4. The invert emulsion of claim 3 used for oil drilling or paper manufacture.

5. The invert emulsion of claim 1 containing on a weight percent basis:

| | |
|---|---|
| Solvent | 40–60 |
| Surfactant | 1–4 |
| Water | 0–10 |
| Organophilic clay | 0.5–5.0 |
| CMHEC, starch or guar | 40–60 |

6. The invert emulsion of claim 5 where the solvent is diesel oil, mineral oil or paraffin oil.

7. The invert emulsion of claim 6 where the surfactant is an imidazoline.

* * * * *